Jan. 27, 1970  C. E. McCANN  3,491,892
MULTICHANNEL DEVICE FOR LIQUID TREATMENT
Filed April 15, 1968  2 Sheets-Sheet 1
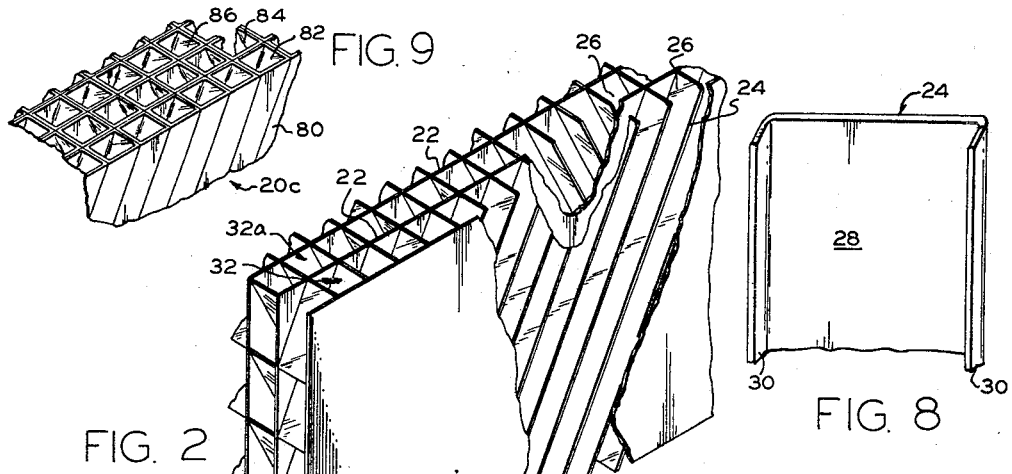
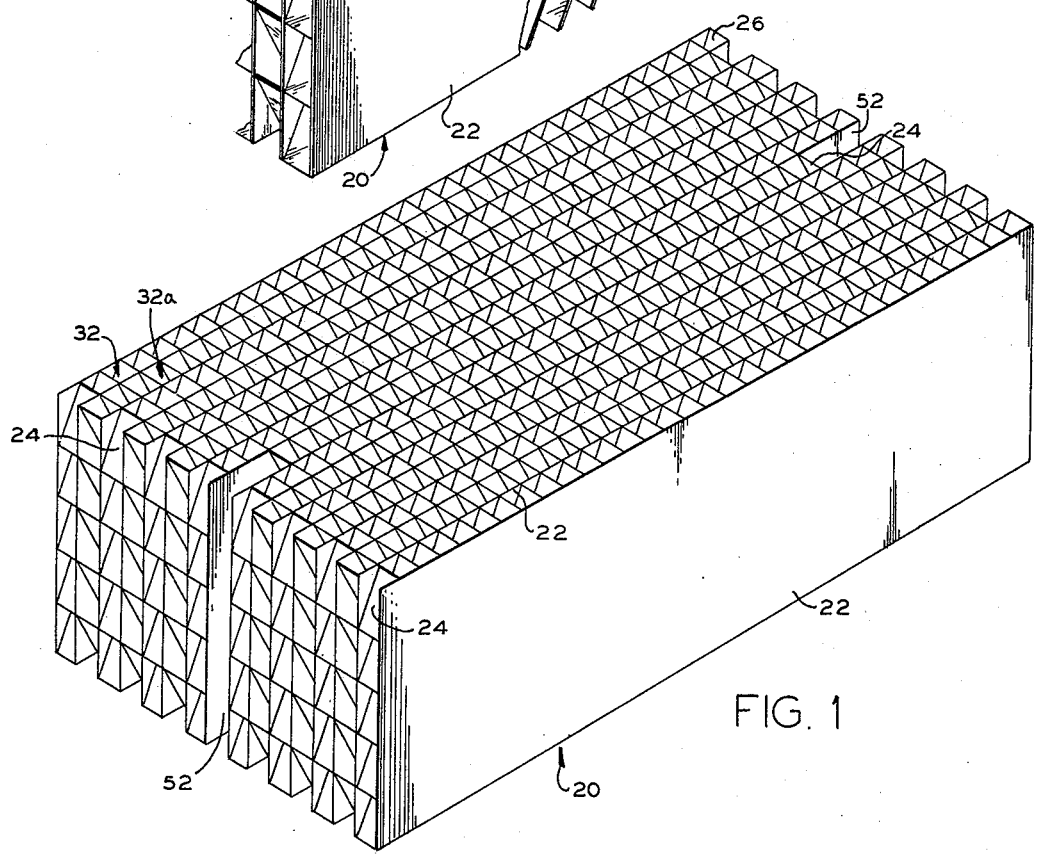
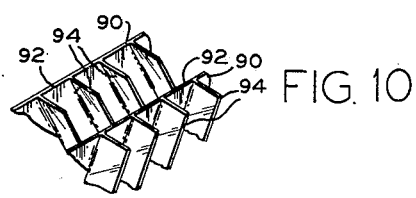
CURTIS E. McCANN
INVENTOR
BY
BUCKHORN, BLORE, KLARQUIST & SPARKMAN
ATTORNEYS

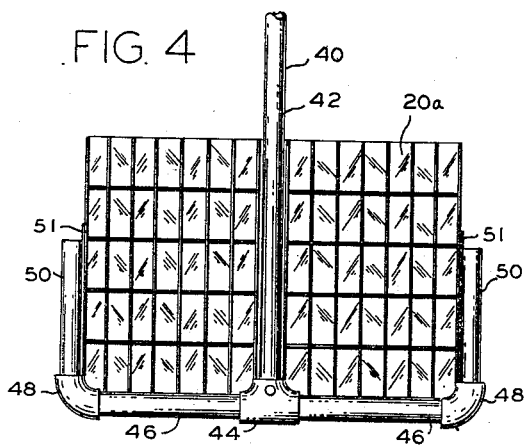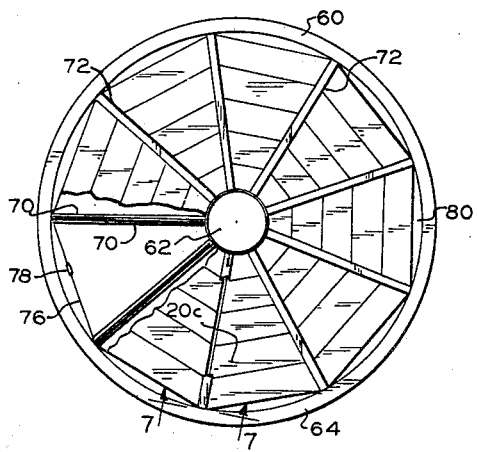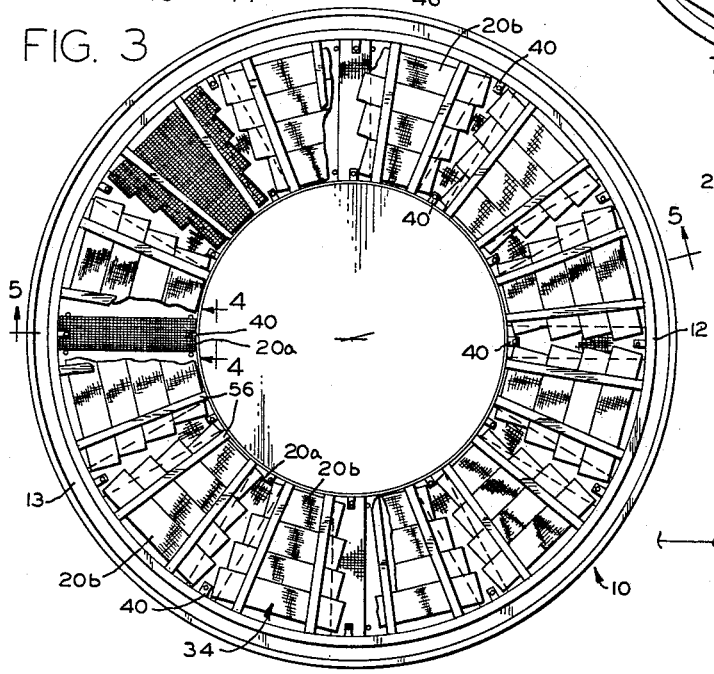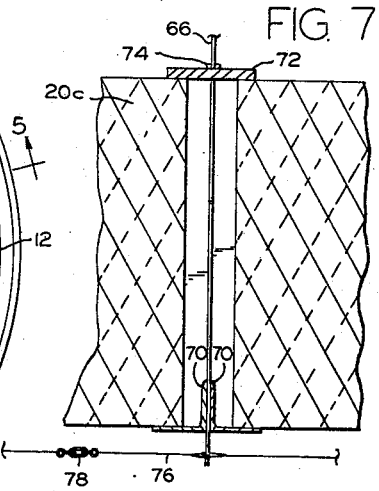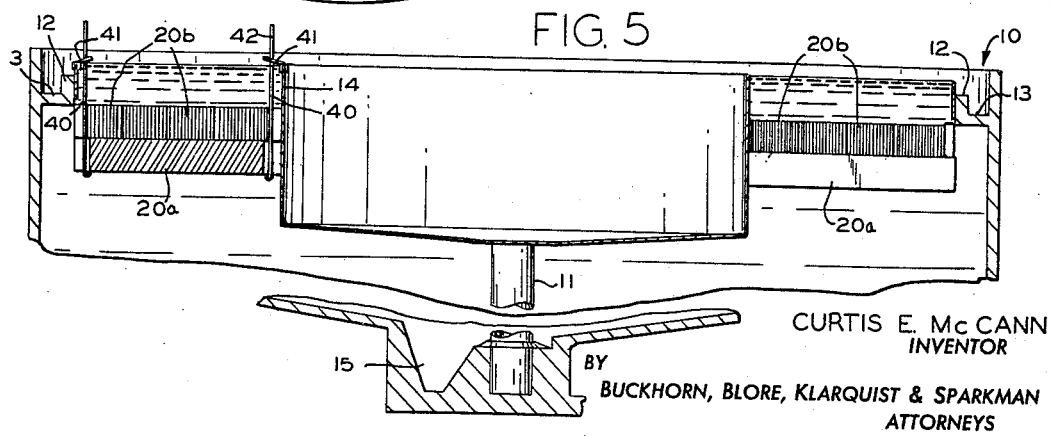

United States Patent Office 3,491,892
Patented Jan. 27, 1970

3,491,892
MULTICHANNEL DEVICE FOR LIQUID TREATMENT
Curtis E. McCann, Corvallis, Oreg., assignor to Neptune Microflo, Incorporated, Corvallis, Oreg., a corporation of Oregon
Filed Apr. 15, 1968, Ser. No. 721,250
Int. Cl. B01d 43/00
U.S. Cl. 210—521       9 Claims

ABSTRACT OF THE DISCLOSURE

A device for liquid treatment such as for separating settleable particles from liquids which comprises a plurality of spaced apart parallel vertical walls, between adjacent ones of which extend inclined spaced apart parallel baffles to form inclined conduits or flow channels. Each set of baffles is inclined in the opposite direction from the inclination of its adjacent set. The baffles and vertical walls form a relatively rigid self supporting truss-like structure which may be placed at the top of a tank of liquid and the liquid caused to flow upwardly through the conduits. The settleable particles of material in the liquid flowing through the conduits are deposited upon the baffles whence they slide downwardly therealong and drop therefrom to the bottom of the tank.

BACKGROUND OF THE INVENTION

Where a liquid containing solid impurities passes at a slow rate through an inclined conduit of small cross section, the solid impurities tend to settle on the conduit bottom and will gradually slide out the bottom. Solids can more rapidly be separated from a liquid by passing the liquid through inclined conduits than by permitting the liquid simply to stand in a settling tank.

An object of the present invention is to provide a self supporting inclined conduit device for liquid treatment.

A more particular object of the present invention is to provide an inclined conduit type liquid-solid separator adapted to be fabricated from relatively inexpensive semi-rigid plastic materials or the like and so arranged as to form a rigid trusslike structure facilitating its installation and use.

A still further object of the present invention is to provide a separator of the type described that can be more economically and efficiently constructed than those known heretofore.

SUMMARY OF THE INVENTION

An illustrated embodiment of the present invention comprises a plurality of spaced apart parallel vertical sheets of semi-rigid material having inclined spaced apart parallel baffles joined to adjacent pairs of such sheets to form inclined conduits or channels through which liquid can flow. The sets of baffles between the pairs of sheets are inclined in a direction opposite to the inclination of the adjacent sets, thereby to form a relatively rigid trusslike structure. The baffles are, of course, effective to provide a plurality of surfaces upon which liquid can flow. In the case of liquid-solid separators, the baffles are effective to receive settleable particles of material from the liquid flowing upwardly through the conduits, which particles may travel downwardly on the baffles to the lower edges and thence may fall to the bottom of the tank from which they can easily be removed.

A principal advantage of a structure formed in accordance with the present invention is that it is structurally sound and can be self-supporting as a beam modular unit in relatively long sections.

BRIEF DESCRIPTION OF THE DRAWINGS

FIG. 1 is a perspective view of a device constructed in accordance with the present invention;
FIG. 2 is a perspective view, with parts broken away, of a portion of the device shown in FIG. 1;
FIG. 3 is a plan view of a settling tank in which devices according to the present invention have been installed;
FIG. 4 is a section taken on line 4—4 of FIG. 3;
FIG. 5 is a section taken on line 5—5 of FIG. 3;
FIG. 6 is a plan view of another settling tank in which devices according to the present invention have been installed in a different manner;
FIG. 7 is a section on line 7—7 of FIG. 6;
FIG. 8 is an enlarged, fragmentary view of a baffle utilized in the construction of the embodiment of FIG. 1;
FIG. 9 is a fragmentary perspective view of another embodiment of the invention; and
FIG. 10 is a fragmentary, exploded view of still another embodiment of the invention.

DESCRIPTION OF THE PREFERRED EMBODIMENT

Referring first to FIGS. 3–5, devices made in accordance with the present invention are illustrated at 20a and 20b installed in a settling tank 10 into which an influent liquid is introduced through a central inlet 11. The liquid carrying separable particulate matter flows upwardly through the tank 10 at a low rate of flow. Clarified liquid overflows the rim 12 of the tank into a collection trough 13, thence to be carried away by an outlet pipe (not shown). Sediment which settles out from the liquid is received in a sediment trough 15 at the bottom of the tank 10 from which it too is carried away.

The devices 20a and 20b are provided in the settling tank 10 as separators 20 to facilitate separation of solids from the liquid, as for example, in water or sewage treatment. The separators 20 are supported near the top of the tank 10 and below the surface of the liquid therein so that the liquid passes through the separators prior to reaching the collection trough 13. A detailed description of the manner of installation and support of the separators 20 in the tank 10 will be described hereafter.

One embodiment of an individual separator 20 itself is shown in greater detail in FIGS. 1 and 2. It consists of a plurality of parallel vertical sheets 22, which are relatively thin but preferably semi-rigid or rigid and may, for example, be made from .010 inch thick polyvinylchloride. A PVC sheet material suitable for this use is Union Carbide Corp. "Bakelite" VCA 3605, Food Packaging Grade.

A plurality of channel shaped plastic baffles 24 (see FIG. 8) are attached to adjacent ones of the parallel sheets 22 to form inclined parallelepiped-shaped channels or conduits 26 through which the liquid in the tank flows upwardly. The baffles 24 are preferably inclined at an angle of between about 45° and 60° to the horizontal and are parallel to each other. The baffles 24 are also preferably of a rigid or semi-rigid material and may, for example, comprise an .025 inch thick extruded ABS plastic channel having a web 23 and flanges 30. (See FIG. 8.) An ABS (acrylonitrile-butadiene-styrene) plastic suitable for this use is U.S. Rubber Company "Kralastic," MV 1801, National Sanitation Foundation Quality, for use in potable water. The flanges 30 of the channel sections are attached to the sheets 22 by a plastic solvent or other type of plastic adhesive.

The spacing of the sheets 22 and the baffles 24 may be varied as may the height and length of the separator to meet the conditions of installation, liquid to be treated and like conditions. For water treatment, a typical unit may be formed to define conduits 26 about two inches square in cross section and about two feet in length.

A feature of the invention is that the baffles 24 are attached to the sheets 22 in sets 32, and each set 32 is inclined in a direction opposite to the inclination of the adjacent set 32a. Thus the baffles 24 and the attached parallel sheets 22, even when comprising a semi-rigid material of the nature of the plastics named, form a rigid trusslike structure which has substantial structural strength enabling it to be self supporting. Obviously, other materials can be utilized, such as, for example, metal or plywood and other configurations of components utilized. However, if the structure is to be self-supporting, it is necessary that the materials and construction be such as to form between adjacent rows of conduits a vertical wall or element having a substantial resistance to bending in the vertical direction. An apparatus constructed in accordance with this invention is suitable for use in extended surface applications, such as, for example, cooling towers and in trickling filters for sewage treatment, and in a variety of solid-liquid separation devices.

Referring again to FIGS. 3–5, which are illustrative of one application of devices made in accordance with the invention, the separators 20 are installed in sector groups 34 supported from the outer rim 12 and an inner rim 14. Each sector group 34 comprises a pair of laterally spaced, radially extending separators 20a which function as beams to support a plurality of generally circumferentially extending separators 20b. The sector groups 34 are hung from supports 40 attached to the rims 12 and 14 by brackets 41. (See FIG. 5.) Each support 40 includes a vertical pipe 42 terminating in a T 44 which supports horizontal pipe members 46. A socket type L 48 attached to the outboard end of each horizontal pipe member 46 receives another pipe retaining member 50.

The supports 40 are received in cutouts 52 formed in each end of the separators 20a, as shown in FIG. 1. A sheet 51 of thin plastic or other suitable material is preferably placed between the retaining members 50 and the separators 20a to reinforce the latter.

As shown in FIG. 5, in each sector group 34 four circumferentially extending separator units 20b are positioned side-by-side with their opposite ends supported by adjacent pairs of radially extending units 20a in such manner that no uncovered area is present. The units 20a are at such depth that the tops of the units 20b are beneath the level of the overflow rim 12. It can thus be seen that the manner of installation of the separators 20a and 20b is such as to make it necessary for all of the influent liquid to pass through at least one separator 20 before reaching the overflow rim 12 since such liquid must pass either through a separator 20a or a separator 20b.

An alternate type of installation using the separators 20 of the present invention is shown in FIGS. 6 and 7. In the type of installation there illustrated, a circular settling tank 60 having a center column 62 and an outer rim 64 is provided with a plurality of sets of straps 66 hung from the center column 62 and the rim 64 at circumferentially spaced intervals. Two radially extending supporting angles 70 are fixed to the bottoms of each set of straps 66. Circumferentially extending separators 20c are seated on the angles 70 in the manner shown in FIG. 7. Short circuiting is minimized at their upper surfaces by radially extending one inch by six inch redwood members 72 slotted to pass the straps 66 and retained by pins 74. The straps 66 are furnished circumferential support by circumferentially extending spacing cables 76 adjustable by turnbuckles 78. Contoured separators 80 installed outwardly of the outermost separators 20c insure that all of the influent liquid passes through the separators prior to reaching the overflow rim 64. The type of installation shown in FIGS. 6 and 7 requires that the separators 20c have their ends formed at an angle in plan view.

For installation in square or rectangular tanks, the separators 20 are supported on beam type modular units having end cutouts 52 as shown in FIG. 1 which are hung from supports 40 attached to the sides of the tank. Alternatively, the separators 20 can be supported by a framework of wood, metal, fiberglass or plastic structural shapes.

Other suitable modes of construction of devices of the invention are shown in FIGS. 9 and 10. In accordance with the embodiment of FIG. 9, the device 20c comprises a plurality of individually formed rectangular conduits or tubes 80 formed of any suitable rigid or semi-rigid material. The tubes 80 are arranged in parallel rows 82, 84, 86 with the tubes of adjacent rows oppositely inclined, the tubes of each row being secured to each other and the mating faces of adjacent rows also being secured together by any suitable means, as for example, by an adhesive. The adjacent walls of the rows will in effect form a substantially planar element having a substantial resistance to bending in the vertical direction. In accordance with the embodiment of FIG. 10, the device is formed of individually formed units 90 comprising a planar sheet or wall 92 having parallel webs or flanges 94 extending therefrom. Such units may be formed from suitable materials such as plastics by molding or extrusion, or otherwise. The units 90 are secured together by suitably bonding the outer edges of the flanges 94 to the back surface of the sheet or wall 92 of an adjacent unit, the flanges 94 of adjacent units being oppositely inclined with respect to each other. Still other methods of construction and fabrications of the devices of the invention will be obvious.

I claim:
1. A self-supporting channel-forming structure for use in the treatment of liquids, comprising:
 a plurality of at least three spaced-apart, parallel, vertical imperforate sheets of a material selected from the class consisting of rigid and semi-rigid materials,
 at least two sets of inclined, spaced-apart, parallel baffles of a material selected from the class consisting of rigid and semi-rigid materials joining adjacent one of said sheets to form inclined channels, said baffles comprising planar sheets extending at right angles to said vertical sheets,
 each set of said baffles being inclined in the direction opposite to the direction of inclination of the adjacent set of baffles.
2. Apparatus as in claim 1 in which said vertical sheets are made of semi-rigid plastic material.
3. Apparatus as in claim 1 in which said baffles are channel-shaped members having flanges at their edges, said flanges being attached to said parallel sheets.
4. Apparatus as in claim 3 in which said baffles are made of semi-rigid material.
5. Apparatus as in claim 1 in which said baffles are inclined at an angle of between about 45° and 60° to the horizontal.
6. Apparatus for separating solid particles from liquids, comprising:
 a settling tank,
 means to introduce an influent liquid into the bottom of said tank to flow upwardly through said tank,
 means to remove effluent liquid from the top of said tank,
 at least one separator supported within said tank positioned below the surface of said liquid in said tank, said separator comprising:
  a plurality of spaced apart parallel vertical planar sheets of semi-rigid material, and
  at least two sets of inclined, spaced apart parallel baffles of semi-rigid material joined to adjacent ones of said parallel sheets to form inclined channels through which liquid in said tank upwardly flows,
 each set of said baffles being inclined in the opposite direction from the inclination of its adjacent set, said sets of baffles and said attached parallel sheets forming a rigid trusslike structure,
 said baffles being effective to receive settleable par- ticles of material from said liquid flowing through said channels and to guide said particles downwardly to the bottom edge of said baffles from which said particles drop to said bottom of said tank.

7. Apparatus as described in claim 6 further comprising:
   a pair of said separators,
   means supporting said separators from opposite sides of said tank in spaced relation to each other, and
   a plurality of said separators positioned side-by-side with their opposite ends supported by said pair of separators,
   all of said separators being positioned below the surface of liquid in said tank, whereby said influent liquid flowing upwardly through said tank passes through at least one of said separators.

8. Apparatus as described in claim 7, in which said tank is an annular tank having an inner rim and an outer rim, said pair of separators being generally radially extending and supported from said inner and outer rims thereof.

9. Apparatus as described in claim 6, further comprising:
   a circular settling tank having a peripheral rim and a center column,
   a plurality of radially extending supporting means attached to said center column and said rim at circumferentially spaced intervals therearound,
   and a plurality of said separators positioned side-by-side and supported by said supporting means in generally circumferentially extending relation below the surface of the liquid in said tank.

References Cited

UNITED STATES PATENTS

| 1,020,013 | 3/1912 | Arbuckle | 210—521 |
| 3,232,865 | 1/1966 | Quinn et al. | 261—112 X |
| 3,262,682 | 7/1966 | Bredberg | 261—112 X |

FOREIGN PATENTS

| 23,084 | 11/1930 | Netherlands. |
| 386,312 | 1/1933 | Great Britain. |

JAMES L. DECESARE, Primary Examiner

U.S. Cl. X.R.

261—112